(12) United States Patent
Meshenky et al.

(10) Patent No.: US 8,424,592 B2
(45) Date of Patent: Apr. 23, 2013

(54) HEAT EXCHANGER HAVING CONVOLUTED FIN END AND METHOD OF ASSEMBLING THE SAME

(75) Inventors: Steven P. Meshenky, Racine, WI (US); Charles M. Rastall, Cudahy, WI (US)

(73) Assignee: Modine Manufacturing Company, Racine, WI (US)

( * ) Notice: Subject to any disclaimer, the term of this patent is extended or adjusted under 35 U.S.C. 154(b) by 1301 days.

(21) Appl. No.: 12/182,747

(22) Filed: Jul. 30, 2008

(65) Prior Publication Data

US 2009/0025916 A1     Jan. 29, 2009

Related U.S. Application Data

(63) Continuation-in-part of application No. 12/061,191, filed on Apr. 2, 2008, now abandoned, and a continuation-in-part of application No. PCT/US2008/051747, filed on Jan. 23, 2008.

(60) Provisional application No. 60/881,919, filed on Jan. 23, 2007.

(51) Int. Cl.
    *F28D 1/04*    (2006.01)
    *F28F 1/14*    (2006.01)

(52) U.S. Cl.
    USPC .......................................... 165/151; 165/181

(58) Field of Classification Search .............. 165/151, 165/152, 179, 181, 183, 81, 82, 84, 109.1
    See application file for complete search history.

(56) References Cited

U.S. PATENT DOCUMENTS

| | | | |
|---|---|---|---|
| 1,553,093 A * | 9/1925 | Modine | 165/151 |
| 2,178,095 A | 10/1939 | Bowser | |
| 2,252,211 A | 8/1941 | Seemiller | |
| 2,329,789 A | 9/1943 | Schank et al. | |
| 2,615,687 A | 10/1952 | Simmons | |
| 2,735,698 A | 2/1956 | Brinen | |
| 2,782,009 A | 2/1957 | Rippingille | |
| 2,819,731 A | 1/1958 | Louthan | |
| 3,262,495 A | 7/1966 | Baird | |

(Continued)

FOREIGN PATENT DOCUMENTS

| | | |
|---|---|---|
| CH | 318033 | 12/1956 |
| DE | 2903543 | 8/1980 |

(Continued)

OTHER PUBLICATIONS

DE102009015892.8 German Search Report, dated Sep. 21, 2009, 4 pages.

(Continued)

*Primary Examiner* — Tho V Duong
(74) *Attorney, Agent, or Firm* — Michael Best & Friedrich LLP

(57) ABSTRACT

The present invention provides a heat exchanger for transferring heat between a first working fluid and a second working fluid. The heat exchanger can include a corrugated fin positionable along a flow path of the first working fluid between adjacent tube walls and being operable to increase heat transfer between the first working fluid and the second working fluid. The fin can include a leg defined between adjacent folds. The heat exchanger can also include a plurality of convolutions extending inwardly from a distal end of the leg and terminating at different distances from the end.

11 Claims, 12 Drawing Sheets

U.S. PATENT DOCUMENTS

| | | | |
|---|---|---|---|
| 3,313,343 A | 4/1967 | Ware et al. | |
| 3,372,743 A | 3/1968 | Pall et al. | |
| 4,096,616 A | 6/1978 | Coffinberry | |
| 4,303,052 A | 12/1981 | Manfredo et al. | |
| 4,420,039 A | 12/1983 | Dubrovsky | |
| 4,428,418 A | 1/1984 | Beasley et al. | |
| 4,436,145 A | 3/1984 | Manfredo et al. | |
| 4,474,162 A | 10/1984 | Mason | |
| 4,733,722 A | 3/1988 | Forbes et al. | |
| 4,823,868 A | 4/1989 | Neebel | |
| 4,903,762 A | 2/1990 | Marsais et al. | |
| 5,029,636 A | 7/1991 | Kadle | |
| 5,307,870 A | 5/1994 | Kamiya et al. | |
| 5,372,187 A * | 12/1994 | Haushalter | 165/109.1 |
| 5,417,280 A | 5/1995 | Hayashi et al. | |
| 5,560,424 A | 10/1996 | Ogawa | |
| 5,623,989 A * | 4/1997 | Kroger | 165/152 |
| 5,625,229 A | 4/1997 | Kojima et al. | |
| 5,636,685 A | 6/1997 | Gawve et al. | |
| 5,671,806 A | 9/1997 | Schmalzried | |
| 5,685,075 A | 11/1997 | Kato | |
| 5,845,701 A | 12/1998 | Ruppel et al. | |
| 5,996,633 A | 12/1999 | Kato | |
| 6,019,169 A | 2/2000 | Ruppel et al. | |
| 6,164,370 A | 12/2000 | Robinson et al. | |
| 6,179,050 B1 | 1/2001 | Dey et al. | |
| 6,293,337 B1 | 9/2001 | Strahle et al. | |
| 6,435,268 B1 * | 8/2002 | Bhatti et al. | 165/111 |
| 6,474,408 B1 | 11/2002 | Yeh et al. | |
| 6,729,388 B2 * | 5/2004 | Emrich et al. | 165/153 |
| 6,904,965 B2 | 6/2005 | Beck et al. | |
| 6,920,918 B2 | 7/2005 | Knecht et al. | |
| 6,964,296 B2 | 11/2005 | Memory et al. | |
| 7,032,313 B2 | 4/2006 | Memory et al. | |
| 7,040,386 B2 * | 5/2006 | Shimoya et al. | 165/153 |
| 7,077,190 B2 | 7/2006 | Hayashi et al. | |
| 7,107,680 B2 | 9/2006 | Ueda | |
| 7,174,948 B2 | 2/2007 | Schindler et al. | |
| 7,204,302 B2 | 4/2007 | Shibagaki et al. | |
| 7,255,159 B2 | 8/2007 | Sagasser et al. | |
| 7,367,386 B2 | 5/2008 | Sato et al. | |
| 7,487,589 B2 | 2/2009 | Smith et al. | |
| 8,016,025 B2 | 9/2011 | Brost et al. | |
| 2002/0007935 A1 | 1/2002 | Marsala | |
| 2003/0010480 A1 | 1/2003 | Shibagaki et al. | |
| 2004/0177668 A1 | 9/2004 | Sagasser et al. | |
| 2005/0161206 A1 | 7/2005 | Ambros et al. | |
| 2005/0224070 A1 | 10/2005 | Hanai et al. | |
| 2006/0201663 A1 | 9/2006 | Strahle et al. | |
| 2006/0231240 A1 | 10/2006 | Rothenhofer et al. | |
| 2006/0283585 A1 | 12/2006 | Smith et al. | |
| 2007/0012430 A1 | 1/2007 | Duke et al. | |
| 2007/0056721 A1 | 3/2007 | Usui et al. | |
| 2007/0114007 A1 | 5/2007 | Schindler et al. | |
| 2007/0175617 A1 | 8/2007 | Brost et al. | |
| 2007/0227715 A1 | 10/2007 | Shimoya et al. | |
| 2008/0041556 A1 | 2/2008 | Braun et al. | |
| 2008/0047696 A1 | 2/2008 | Sperandei et al. | |
| 2009/0194265 A1 | 8/2009 | Nakamura | |
| 2009/0250201 A1 | 10/2009 | Grippe et al. | |
| 2010/0025024 A1 | 2/2010 | Meshenky et al. | |

FOREIGN PATENT DOCUMENTS

| | | |
|---|---|---|
| DE | 3743293 | 6/1989 |
| DE | 3815070 | 11/1989 |
| DE | 4223423 | 1/1994 |
| DE | 4307053 | 9/1994 |
| DE | 4313505 | 10/1994 |
| DE | 19519633 | 12/1996 |
| DE | 69315281 | 3/1998 |
| DE | 19644584 | 4/1998 |
| DE | 19651625 | 6/1998 |
| DE | 19853455 | 6/1999 |
| DE | 19836889 | 2/2000 |
| DE | 20003919 | 5/2000 |
| DE | 19902004 | 7/2000 |
| DE | 10040645 | 6/2002 |
| DE | 10238882 | 5/2003 |
| DE | 10242311 | 3/2004 |
| DE | 10359806 | 7/2005 |
| DE | 202004020294 | 5/2006 |
| DE | 102005034997 | 2/2007 |
| EP | 0242063 | 10/1987 |
| EP | 0584806 | 3/1994 |
| EP | 0704667 | 4/1996 |
| EP | 0974804 | 1/2000 |
| EP | 1376043 | 1/2004 |
| EP | 1411315 | 4/2004 |
| EP | 1464908 | 10/2004 |
| EP | 1522811 | 4/2005 |
| EP | 1544564 | 6/2005 |
| FR | 2447529 | 8/1980 |
| FR | 2777645 | 10/1999 |
| GB | 1129924 | 10/1968 |
| JP | 01305296 | 12/1989 |
| JP | 4198692 | 7/1992 |
| JP | 4332392 | 11/1992 |
| JP | 08025028 | 1/1996 |
| JP | 2000097589 | 4/2000 |
| JP | 2000121286 | 4/2000 |
| JP | 2000304486 | 11/2000 |
| JP | 2003106785 | 4/2003 |
| JP | 2003240387 | 8/2003 |
| JP | 2007003029 | 1/2007 |
| JP | 2007225190 | 9/2007 |
| RU | 2047081 | 10/1995 |
| WO | 2004085947 | 10/2004 |
| WO | 2005001366 | 1/2005 |
| WO | 2006010463 | 2/2006 |

OTHER PUBLICATIONS

Office Action from the Patent Office of the People's Republic of China for Application No. 200910133634.3 dated Feb. 16, 2012 (Translation and Original, 14 pages).

First Office Action from the State Intellecutal Property Office of the People's Republic of China for Application No. 200880002935.6 dated Jul. 15, 2010 (3 pages—English Translation).

Office Action from United States Patent office for U.S. Appl. No. 11/594,454 dated Feb. 3, 2010 (8 pages).

PCT/US2008/051747 International Preliminary Report on Patentability dated Aug. 6, 2009 (6 pages).

Chinese Office Action for Application No. 200880002935.6 dated Jan. 26, 2011 (3 pages).

Office Action Non-Final Rejection for U.S. Appl. No. 11/015,159 dated Nov. 9, 2007 (10 pages).

Office Action Final Rejection for U.S. Appl. No. 11/015,159 dated Jun. 11, 2008 (11 pages).

Office Action Request for Restriction / Election for U.S. Appl. No. 11/015,159 dated Jan. 7, 2009 (5 pages).

Office Action Non-Final Rejection for U.S. Appl. No. 11/015,159 dated May 6, 2009 (8 pages).

Office Action Final Rejection for U.S. Appl. No. 11/015,159 dated Nov. 24, 2009 (6 pages).

Office Action Non-Final Rejection for U.S. Appl. No. 11/015,159 dated Apr. 13, 2010 (6 pages).

Office Action Examiner Interview Summary for U.S. Appl. No. 11/015,159 dated Jun. 17, 2010 (4 pages).

Office Action Final Rejection for U.S. Appl. No. 11/015,159 dated Dec. 3, 2010 (6 pages).

PCT/US2008/051747 International Search Report, 3 pages, Dated Jun. 5, 2008.

* cited by examiner

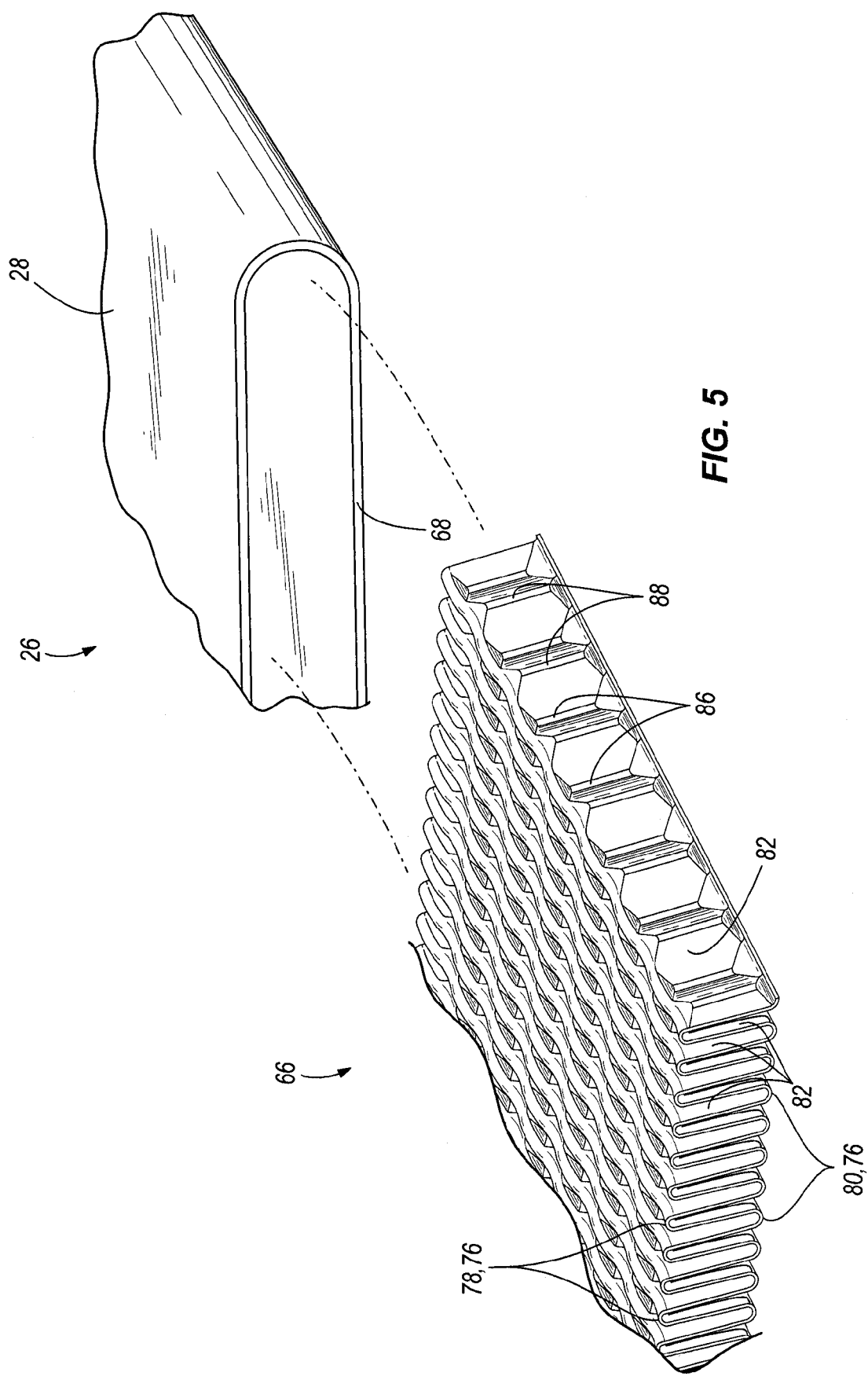

HEAT EXCHANGER HAVING CONVOLUTED FIN END AND METHOD OF ASSEMBLING THE SAME

CROSS-REFERENCE TO RELATED APPLICATIONS

The present application is a continuation-in-part of U.S. patent application Ser. No. 12/061,191, filed Apr. 2, 2008, and is also a continuation-in-part of PCT Patent Application Serial Number PCT/US2008/051747, filed Jan. 23, 2008, which claims priority to U.S. Provisional Application Ser. No. 60/881,919 filed Jan. 23, 2007, the entire contents of which are hereby incorporated by reference.

FIELD OF THE INVENTION

The present invention relates to heat exchangers and more particularly, to a fin for an exhaust gas recirculation cooler and a method of forming the same.

SUMMARY

In some embodiments, the present invention provides a heat exchanger for transferring heat between a first working fluid and a second working fluid. The heat exchanger can include a pair of spaced apart headers, a number of tubes extending between the pair of headers and providing a flow path for the first working fluid and being positioned along a flow path for the second working fluid, and a fin supportable in one of the tubes and having a fold extending in a direction substantially parallel to a length of the one of the tubes between the pair of headers. The fin can include a number of recesses extending into and spaced along the fold.

The present invention also provides a heat exchanger for transferring heat between a first working fluid and a second working fluid including a pair of spaced apart headers, a number of tubes extending between the pair of headers and providing a flow path for the first working fluid and being positioned along a flow path for the second working fluid, and a fin supportable in one of the tubes and having a fold extending in a direction substantially parallel to the flow path for the first working fluid through the tubes. The fold can define first and second legs of the fin. A recess can be formed on the first leg and a protrusion can be formed on the second leg opposite to the recess on the first leg.

In some embodiments, the present invention provides a heat exchanger for transferring heat between a first working fluid and a second working fluid including a pair of spaced apart headers, a number of tubes extending between the pair of headers and providing a flow path for the first working fluid and being positioned along a flow path for the second working fluid, and a fin supportable in one of the tubes and having a serpentine fold extending in a direction substantially parallel to a length of the tube between the pair of headers.

The present invention also provides a heat exchanger for transferring heat between a first working fluid and a second working fluid including a corrugated fin positionable along a flow path of the first working fluid between adjacent tube walls and operable to increase heat transfer between the first working fluid and the second working fluid. The fin can include a leg defined between adjacent folds and a plurality of convolutions extending inwardly from a distal end of the leg and terminating at different distances from the end.

In some embodiments, the present invention provides a corrugated fin for a heat exchanger, the heat exchanger having a flow path of a first working fluid and a flow path of a second working fluid and being operable to transfer heat between the first and second working fluids. The fin can include a leg defined between adjacent folds and positionable along the flow path of the first working fluid and a plurality of convolutions extending inwardly from a distal end of the leg and having different lengths in the direction of the flow of the first working fluid along the flow path.

The present invention also provides a method of forming a heat exchanger for transferring heat between a first working fluid and a second working fluid. The method can include the acts of corrugating a fin to define a plurality of legs and forming a plurality of convolutions along one of the plurality of legs, the plurality of convolutions extending inwardly from a distal end of the leg and terminating at different distances from the end.

Other aspects of the invention will become apparent by consideration of the detailed description and accompanying drawings.

BRIEF DESCRIPTION OF THE DRAWINGS

FIG. 5 is an exploded perspective view of a portion of a tube and a fin according to an alternate embodiment of the present invention.

DETAILED DESCRIPTION

Figure 1:
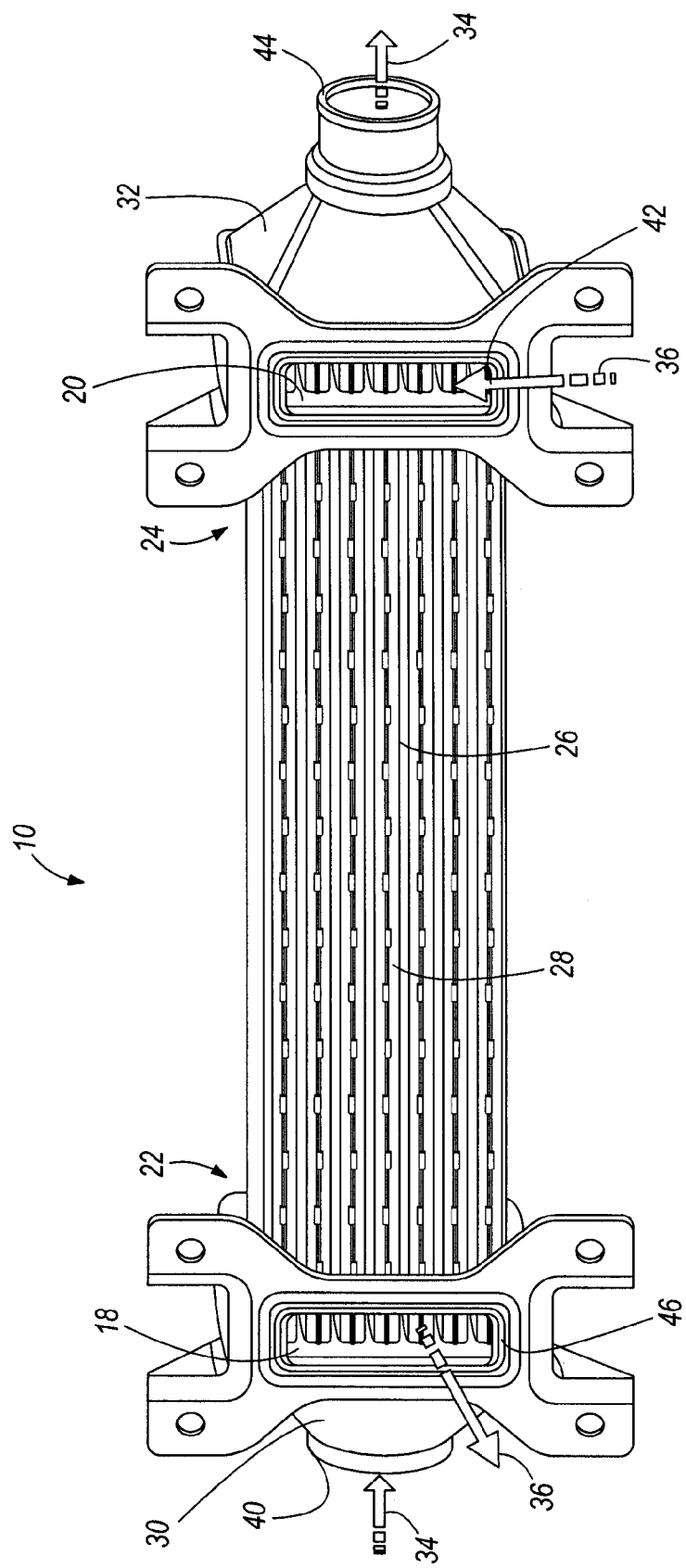
FIG. 1 is a bottom perspective view of a heat exchanger according to some embodiments of the present invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also, it is to be understood that phraseology and terminology used herein with reference to device or element orientation (such as, for example, terms like "central," "upper," "lower," "front," "rear," and the like) are only used to simplify description of the present invention, and do not alone indicate or imply that the device or element referred to must have a particular orientation. In addition, terms such as "first" and "second" are used herein for purposes of description and are not intended to indicate or imply relative importance or significance.

FIGS. 1-4 illustrate a heat exchanger 10 according to some embodiments of the present invention. In some embodiments, including the illustrated embodiments of FIGS. 1-4, the heat exchanger 10 can operate as an exhaust gas recirculation cooler (EGRC) and can be operated with the exhaust system and/or the emission system of a vehicle. In other embodiments, the heat exchanger 10 can be used in other (e.g., non-vehicular) applications, such as, for example, in electronics cooling, industrial equipment, building heating and air-conditioning, and the like. In addition, it should be appreciated that the heat exchanger 10 of the present invention can take many forms, utilize a wide range of materials, and can be incorporated into various other systems.

During operation and as explained in greater detail below, the heat exchanger 10 can transfer heat from a high temperature first working fluid (e.g., exhaust gas, water, engine coolant, $CO_2$, an organic refrigerant, R12, R245fa, air, and the like) to a lower temperature second working fluid (e.g., water, engine coolant, $CO_2$, an organic refrigerant, R12, R245fa, air, and the like). In addition, while reference is made herein to transferring heat between two working fluids, in some embodiments of the present invention, the heat exchanger 10 can operate to transfer heat between three or more fluids. Alternatively or in addition, the heat exchanger 10 can operate as a recuperator and can transfer heat from a high temperature location of a heating circuit to a low temperature location of the same heating circuit. In some such embodiments, the heat exchanger 10 can transfer heat from a working fluid traveling through a first portion of the heat transfer circuit to the same working fluid traveling through a second portion of the heat transfer circuit.

Figure 2:
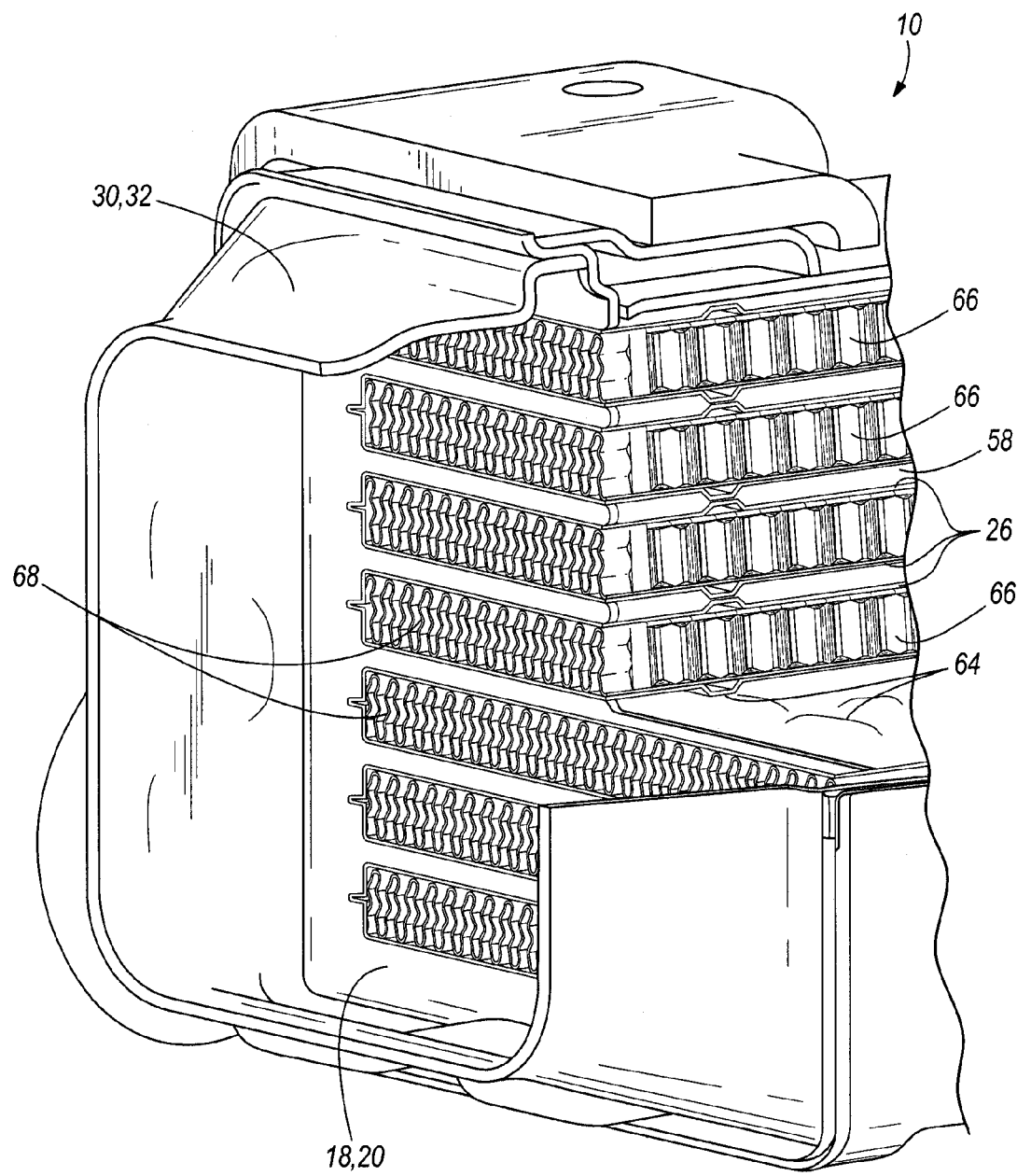
FIG. 2 is a partially cut-away view of a portion of the heat exchanger shown in FIG. 1.
Figure 3:
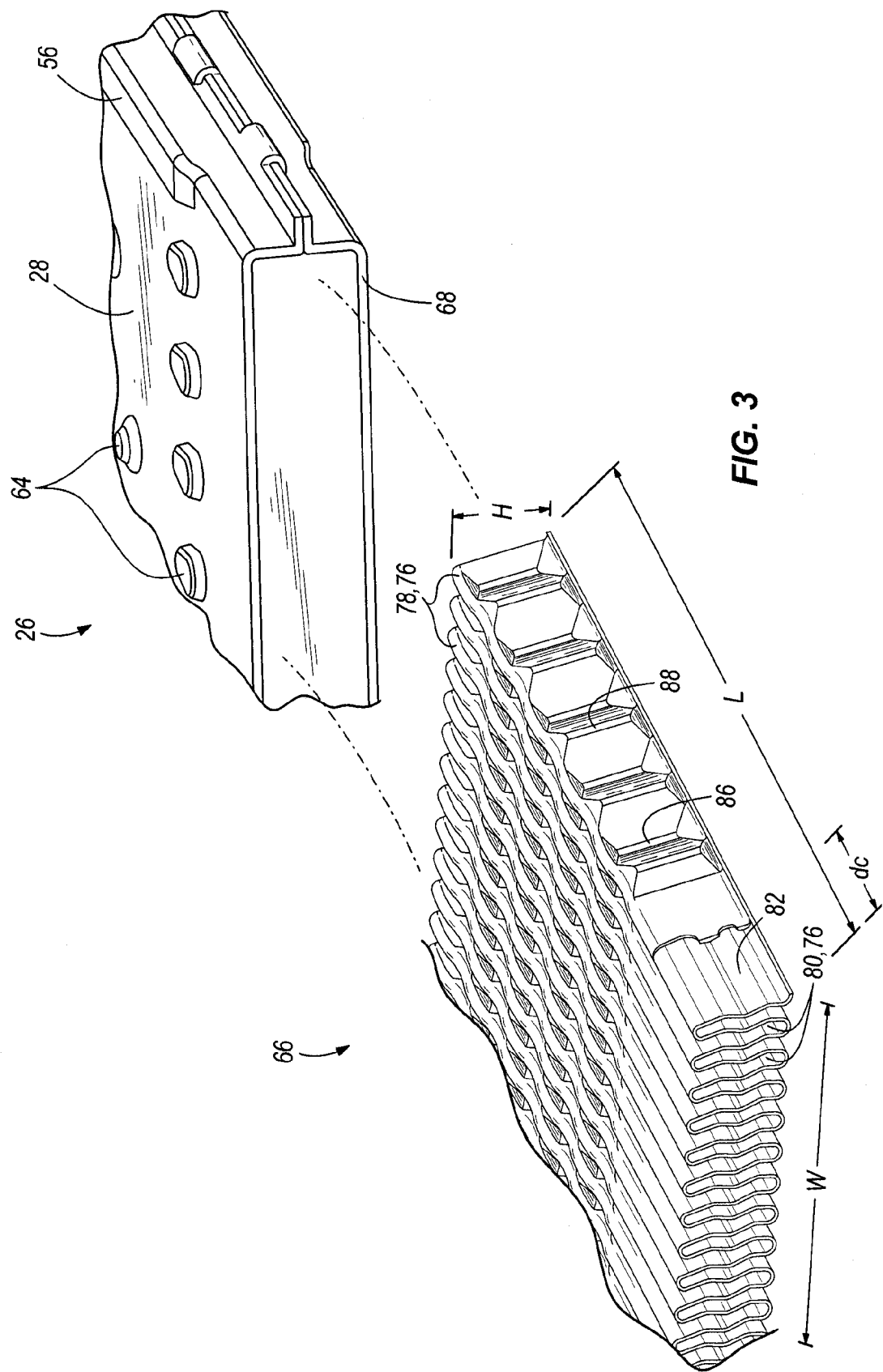
FIG. 3 is an exploded perspective view of a portion of a tube and a fin of the heat exchanger shown in FIG. 1.

As shown in FIGS. 1 and 2, the heat exchanger 10 can include a first header 18 and a second header 20 positioned at respective first and second ends 22, 24 of a stack of heat exchanger tubes 26 having outer surfaces 28 (shown in FIGS. 1, 3, and 5). In the illustrated embodiment of FIGS. 1-4, the first end 22 is secured to a first collecting tank 30 and the second end 24 is secured to a second collecting tank 32. In other embodiments, the heat exchanger 10 can include a single header 18 and/or a single tank 30 located at one of the first and second ends 22, 24 or at another location on the heat exchanger 10.

As shown in FIGS. 1 and 2, each of the tubes 26 can be secured to the first and second headers 18, 20 such that a first working fluid flowing through the heat exchanger 10 is maintained separate from a second working fluid flowing through the heat exchanger 10. More specifically, the heat exchanger 10 defines a first flow path (represented by arrows 34 in FIG. 1) for the first working fluid and a second flow path (represented by arrows 36 in FIG. 1) for a second working fluid, and the first and second flow paths 34, 36 are separated such that the first working fluid is prevented from entering the second flow path 36 and such that the second working fluid is prevented from entering the first flow path 34.

In some embodiments, such as the illustrated embodiment, the tubes 26 are secured to the first and second headers 18, 20 and the first and second tanks 30, 32 such that the first working fluid enters the heat exchanger 10 through a first inlet aperture 40 in the first tank 30, travels through the tubes 26 of the heat exchanger 10 along the first flow path 34, and is prevented from entering the second flow path 36. In these embodiments, the tubes 26 can be secured to the first and second headers 18, 20 and the first and second tanks 30, 32 such that the second working fluid enters the heat exchanger 10 through a second inlet aperture 42 in the second tank 32, travels through the heat exchanger 10 along the second flow path 36 between the tubes 26, and is prevented from entering the first flow path 34.

In other embodiments, the tubes 26 can have other orientations and configurations and the first and second flow paths 34, 36 can be maintained separate by dividers, fins, partitions, and the like. In still other embodiments, the first flow path 34 can extend through some of the tubes 26 while the second flow path 36 can extend through other tubes 26.

As shown in FIG. 2, the headers 18, 20 can have apertures sized to receive one or more of the tubes 26. As illustrated by FIGS. 1 and 2, the first working fluid flowing along the first flow path 34 can enter the tubes 26 through apertures formed in the first header 18. In these embodiments, the first header 18 can also direct the second working fluid from the second inlet aperture 42 between adjacent tubes 26 and can prevent the second working fluid from flowing into the tubes 26. The first header 18 can also prevent the first working fluid from flowing between the tubes 26.

In the illustrated embodiment, the heat exchanger 10 is configured as a cross-flow heat exchanger such that the first flow path 34 or a portion of the first flow path 34 is opposite to the second flow path 36 or a portion of the second flow path 36. In other embodiments, the heat exchanger 10 can have other configurations and arrangements, such as, for example, a parallel-flow or a counter-flow configuration.

In the illustrated embodiment, the heat exchanger 10 is configured as a single-pass heat exchanger with the first working fluid traveling along the first flow path 34 through at least one of a number of tubes 26 and with the second working fluid traveling along the second flow path 36 between adjacent tubes 26. In other embodiments, the heat exchanger 10 can be configured as a multi-pass heat exchanger with the first working fluid traveling in a first pass through one or more of the tubes 26 and then traveling in a second pass through one or more different tubes 26 in a direction opposite to the flow direction of the first working fluid in the first pass. In these embodiments, the second working fluid can travel along the second flow path 36 between adjacent tubes 26.

In yet other embodiments, the heat exchanger 10 can be configured as a multi-pass heat exchanger with the second working fluid traveling in a first pass between a first pair of adjacent tubes 26 and then traveling in a second pass between another pair of adjacent tubes 26 in a direction opposite to the flow direction of the second working fluid in the first pass. In these embodiments, the first working fluid can travel along the first flow path 34 through at least one of the tubes 26.

In the illustrated embodiment, the heat exchanger 10 includes seven tubes 26, each of which has a substantially rectangular cross-sectional shape. In other embodiments, the heat exchanger 10 can include one, two, three, four, five, six, eight, or more tubes 26, each of which can have a triangular, circular, square or other polygonal, oval, or irregular cross-sectional shape.

As mentioned above, in some embodiments, the second flow path 36 or a portion of the second flow path 36 can extend across the outer surface 28 of one or more of the tubes 26. In some such embodiments, ribs 56 (see FIG. 3) can be formed along the outer surfaces 28 of the tubes 26 to at least partially define channels 58 between adjacent tubes 26. Alternatively, as shown in FIG. 5, the tubes 26 of the heat exchanger 10 can be generally oval shaped (i.e., a simple extruded tube) and devoid of ribs 56 defining channels 58. A housing can be provided around the tubes 26 to prevent the second fluid from leaking out of the heat exchanger 10 between adjacent tubes 26. In such an embodiment, the housing would define the second flow path 36 between/around the tubes 26.

In embodiments, such as the illustrated embodiment of FIGS. 1-4, having outwardly extending ribs 56, the ribs 56 of each tube 26 can be secured to an adjacent tube 26. In some such embodiments, the ribs 56 of one tube 26 can be soldered, brazed, or welded to an adjacent tube 26. In other embodiments, adjacent tubes 26 can be secured together with inter-engaging fasteners, other conventional fasteners, adhesive or cohesive bonding material, by an interference fit, etc. In addition, a housing can be provided around the tubes 26 of the embodiment illustrated in FIGS. 1-4.

Additional elevations, recesses, or deformations 64 can also or alternatively be provided on the outer surfaces 28 of the tubes 26 to provide structural support to the heat exchanger 10, prevent the deformation or crushing of one or more tubes 26, maintain a desired spacing between adjacent tubes 26, improve heat exchange between the first and second working fluids, and/or generate turbulence along one or both of the first and second flow paths 34, 36.

The heat exchanger 10 can include fins 66, which improve heat transfer between the first and second working fluids as the first and second working fluids travel along the first and second flow paths 34, 36, respectively. The fins 66 can provide the heat exchanger core (i.e., the tubes 26) with increased surface area for distribution of the heat provided by the first and/or second working fluids. As shown in FIGS. 2, 3, and 5, the fins 66 can be positioned in the tubes 26. Alternatively or in addition, fins 66 can be positioned between adjacent tubes 26. In other embodiments, fins 66 can be integrally formed with the tubes 26 and can extend outwardly from the outer surfaces 28 of the tubes 26, or alternatively, inwardly from inner surfaces 38 of the tubes 26. In some embodiments, the fins 66 can improve the durability and strength of the heat exchanger 10. The configurations (geometrical and topographical) of the fins 66 can be such that the expansion and contraction experienced by the material due to thermal fluctuations can be compensated for with increased flexibility (discussed in further detail below).

In the illustrated embodiment of FIG. 2, a fin 66 is supported in each of the tubes 26, and extends along the entire length or substantially the entire length of each of the tubes 26 between opposite ends 68 of the tubes 26. As FIG. 2 illustrates, the fin 66 can also or alternatively extend across the entire width or substantially the entire width of each of the tubes 26 between opposite sides of the tubes 26. In other embodiments, a fin 26 can be supported in only one or less than all of the tubes 26, and the fin(s) 66 can extend substantially the entire length of the tube(s) 26 between opposite ends 68 of the tube(s) 26, or alternatively, the fin(s) 66 can extend through the tube(s) 26 along substantially less than the entire length of the tube(s) 26. In still other embodiments, two or more fins 66 can be supported by or in each tube 26. In some embodiments, the fins 66 can be secured to the tubes 26. In some such embodiments, the fins 66 are soldered, brazed, or welded to the tubes 26. In other embodiments, the fins 26 can be connected to the tubes 26 in another manner, such as, for example, by an interference fit, adhesive or cohesive bonding material, fasteners, etc.

In some embodiments, the ends 68 of the tubes 26 can be press-fit into one or both of the first and second headers 18, 20. In some such embodiments, the ends 68 of the tubes 26 and the fins 66 supported in the tubes 26 or between the tubes 26 can be at least partially deformed when the tubes 26 and/or the fins 66 are press-fit into the first and/or second headers 18, 20. As such, the tubes 26 and/or the fins 66 are pinched and maintained in compression to secure the tubes 26 and/or the fins 66 in a desired orientation and to prevent leaking. In some embodiments, the tubes 26 can be brazed, soldered, or welded to the first and/or second headers 18, 20.

In the illustrated embodiments, roll-formed sheets of metal are folded to form the fins 66 in a method that will be described in further detail below. In other embodiments, the fins 66 can be cast or molded in a desired shape and can be formed from other materials (e.g., aluminum, copper, iron, and other metals, composite material, alloys, and the like). In still other embodiments, the fins 66 can be cut or machined to shape in any manner, can be extruded or pressed, can be manufactured in any combination of such operations, and the like.

Figure 7:
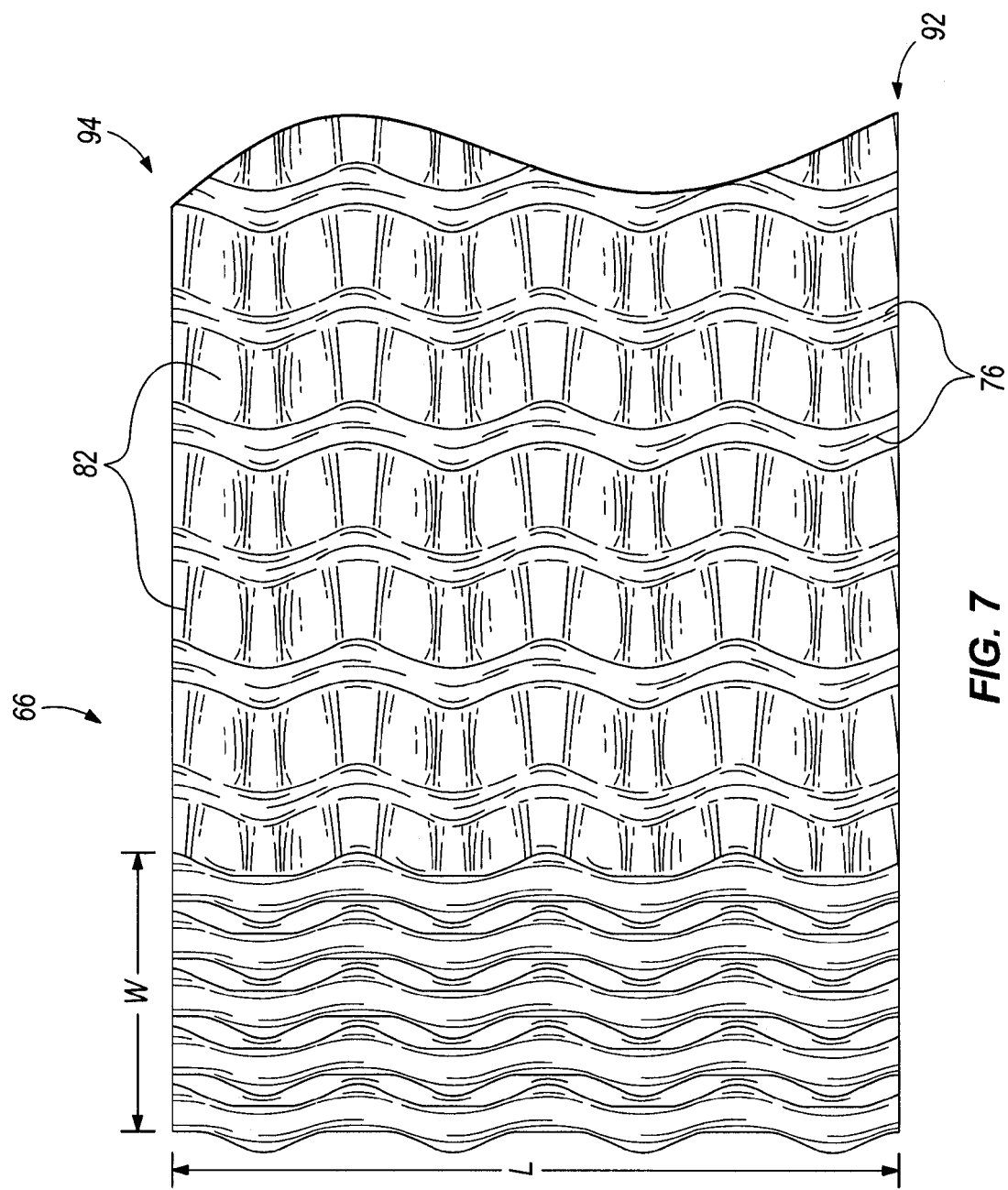
FIG. 7 is a top view of a partially formed fin that can be manufactured according to the method shown in FIG. 9.

As most clearly shown in FIGS. 3 and 7, the fin 66 can be corrugated and have an overall length L, width W, and height H. The length L of the fin 66 is defined as the general direction of fluid flow within the tube 26 (i.e., from the first header 18 to the second header 20). As shown in the embodiment illustrated in FIG. 3, each fold forms a serpentine spine 76 that extends generally in parallel to the length L of the fin 66.

The illustrated embodiment of the fin 66 includes a series of parallel-running spines 76 that form alternating peaks 78 and valleys 80 along the width W of the fin 66. As shown in FIG. 2, the peaks 78 and valleys 80 can engage respective upper and lower interior sides (e.g., between upper and lower sides in FIGS. 2, 3, and 5) of a tube 26. In the illustrated embodiment, legs or flanks 82 extend between each pair of adjacent folds (i.e., from a peak 78 to a valley 80 or vice versa) along the length L, to give the fin 66 a height H. In addition, the fins 66 of some embodiments can have pointed, squared, or irregularly shaped peaks 78 and/or valleys 80. The resulting lateral edge of the fin 66 of the illustrated embodiment, as shown in FIGS. 2 and 3 can be generally wavy. However, in other embodiments, the lateral edge can be generally sinusoidal or saw-toothed, among other shapes. The structural elements formed by each fold 76 of the corrugated fin 66 are described more specifically with reference to FIGS. 4 and 6 below.

Figure 4:
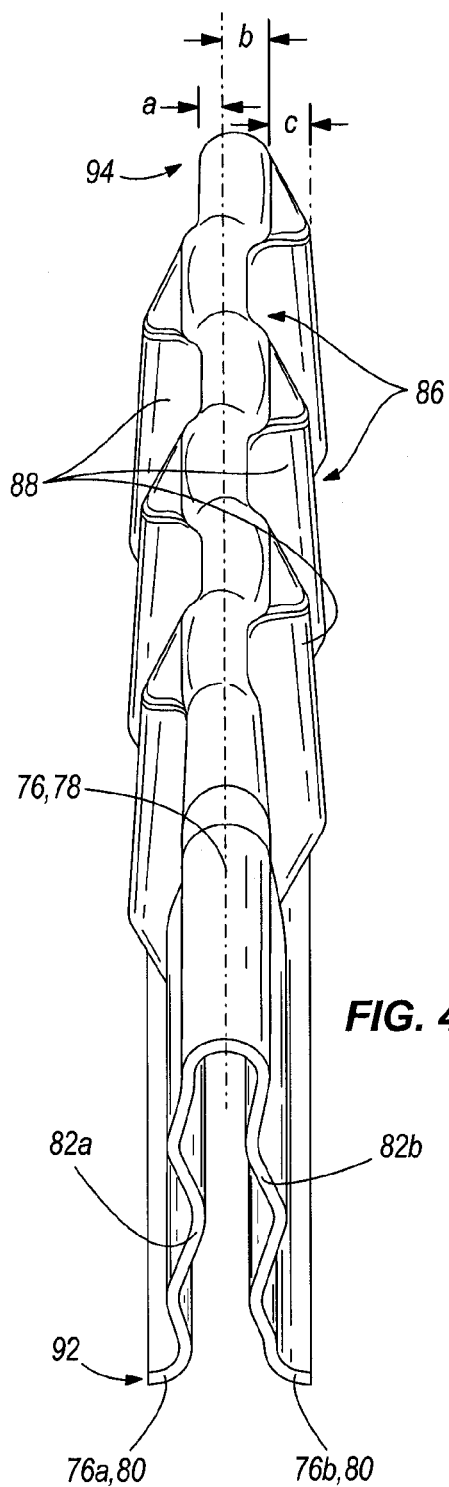
FIG. 4 is a perspective view of a portion of the fin shown in FIG. 3.
Figure 6:
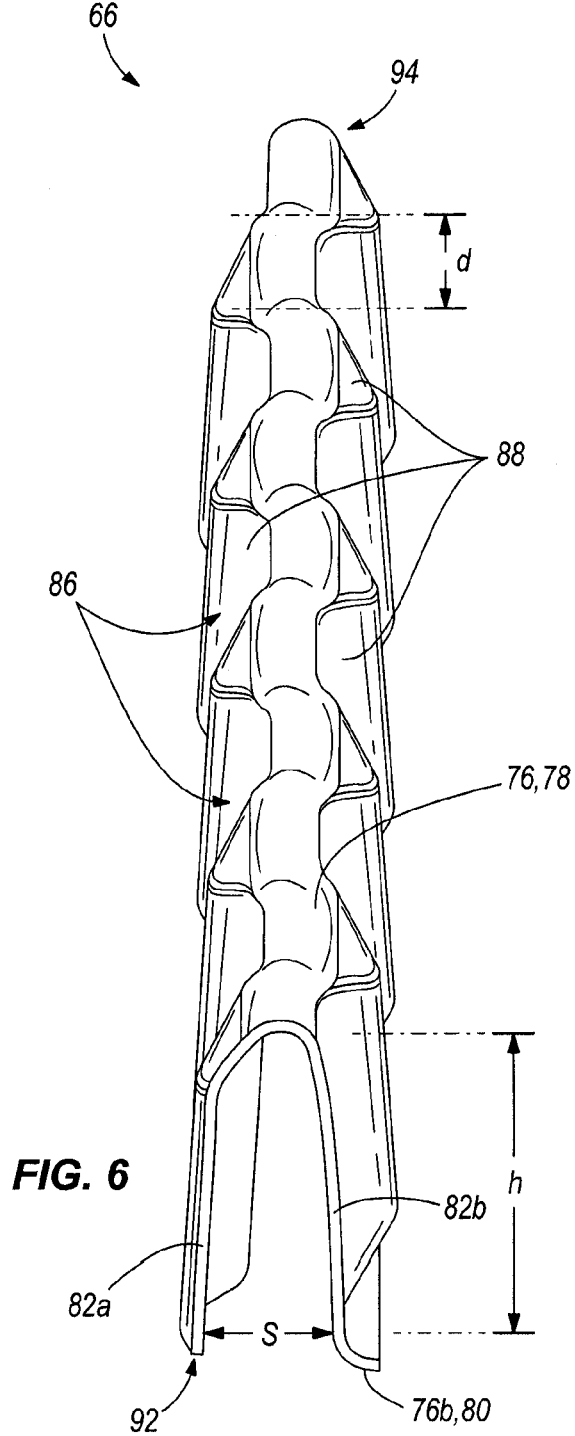
FIG. 6 is a perspective view of a portion of the fin shown in FIG. 5.

As illustrated by FIGS. 4 and 6, a first leg 82*a* can be at least partially defined on one side of a spine 76 and a second leg 82*b* can be at least partially defined on the other side of the spine 76. Fold 76*a* is positioned immediately adjacent to the first leg 82*a* and defines a height h of the leg 82*a*. Similarly, fold 76*b* is positioned at the distal end of the second leg 76*b*, which has the same height h. The space S between adjacent legs 82*a*, 82*b* is defined as the distance between the points located at the same distance along length L and height h of each leg 82. The legs 82 of the fin 66 can also have various topographical configurations. For example, at one point along the length L, the legs 82 can be convoluted or wavy (i.e., when viewed from an end of the fin 66, and at another point along the length L, the legs 82 can be straight.

As shown in FIGS. 3-8, the legs 82 can include contour elements such as recesses 86 and protrusions 88 spaced along their length L. These elements are deformations in the material that forms the fin 66 and do not pierce or provide connections between opposite sides of the fin 66. In some such embodiments, a recess 86 formed on one side of a leg 82 can consequently form a protrusion 88 on the opposite side of the leg 82 (i.e., a recess 86 is a geometric complement of protrusion 88). The contour elements formed in the fin 66 can appear as pyramid, frustum, prism, and/or hemispheroid-like projections or recesses, among others. In the illustrated embodiment, the contour elements each have two planes of symmetry (one of which is the length L, space s plane, and the other of which is the height h, space s plane). As such, the upper half of the contour element is a mirror image of the bottom half (with respect to the height h of the leg 82 it is positioned on). Similarly, the left half of the contour element is a mirror image of the right half (with respect to the length L of the leg 82 it is positioned on). In some embodiments, a protrusion 86 in one leg 82a can be positioned such that it is at least partially receivable in a recess 88 in an adjacent leg 82b (i.e., at the same distance along height h and length L of each leg).

In some embodiments, contour elements can extend along the entire height h of the leg 82 from one fold 76 to an adjacent fold 76 (i.e., from a peak 78 to an adjacent valley 80 or vice versa). Each contour element has a width d, as shown in FIG. 6. In the illustrated embodiment, the width d also indicates the spacing between similar contour elements. In other embodiments, the spacing between similar contour elements can be greater than the width d of an intervening or alternating contour element.

As shown in FIG. 4, the serpentine shape of the spine 76 is determined by the geometry and placement of the recesses 86 and protrusions 88. In the illustrated embodiments, recesses 86 are alternated with protrusions 88 along the length L of each leg 82, and each of the contours extends between adjacent folds 76. Accordingly, a number of recesses 86 and a number of protrusions 88 can be spaced along the edge of each fold 76. FIG. 4 includes reference measurements to more clearly illustrate the geometry of the fin 66. Specifically, reference a indicates the distance between the midline of the fold 76 and the edge of a recess 86, reference b indicates the distance between the midline of the fold 76 and the edge of a protrusion 88, and reference c indicates the lateral distance (i.e., the direction normal to the length L of the fin and width d of the contour element) from the edge of the contour element at the fold 76, to its outermost point/extension.

As illustrated in FIGS. 3-6, a fin 66 formed with longitudinal rows of alternating contour elements 86, 88, can be folded such that the space S between adjacent legs 82 at a particular height h can be generally constant along their length L. Thus, the flow path cross-sectional area is essentially constant along the length L between opposite ends 68 of the tube 26. Accordingly, the first flow path 34 is made circuitous and is consequently longer than a straighter flow path. Such a fin configuration can increase turbulence of the working fluid and consequently allow for more efficient heat transfer without causing significant pressure changes/buildup along the length L of the fin 66. Additionally, contour elements formed in the fins 66 can impact the shape of the spine 76. For example, FIGS. 3-8 show how a pattern of recesses 86 and protrusions 88—specifically longitudinal rows of the continuously alternating contour elements—can create a serpentine-shaped spine 76. As such, even the flow path immediately adjacent to the inner surfaces 38 of the tube 26 is elongated and made circuitous. The serpentine shape of the spine 76 can also provide a reinforced connection between the tube 26 and the fin 66 which can also improve heat transfer.

In embodiments having fins 66 with wavy or contoured cross-sections, such as the illustrated embodiments, the fins 66 operate as elastic members to absorb or at least partially absorb vibrations and/or to absorb expansions and contractions of the fins 66 caused by fluctuating temperatures of the first and/or second working fluids. In some such embodiments, the elasticity of the contoured fins 66 prevents or reduces cracking and breaking of the fins 66. Alternatively or in addition, the elasticity of the contoured fins 66 prevents and/or reduces cracking and breaking of connections (e.g., solder points, braze points, weld points, etc.) between the spines 76 of the fins 66 and the interior sides of the tubes 26.

As shown in FIGS. 5-8, in some embodiments, contours 86, 88 can extend continuously from a first lateral edge 92 to a second lateral edge 94, along the length L of a leg 82. In other embodiments, such as those illustrated in FIGS. 2-4, contours only extend continuously along the length L of a middle portion of the fin 66, while the edges 92, 94 have a different topographical configuration. For example, as shown in the embodiments of FIGS. 3 and 4, the convolutions of the fin 66 can start at a lateral edge 92 of a fin 66 and extend along the length L of the fin 66 a common distance, dc. In some embodiments, the convolutions can extend from a lateral edge of the fin 66 to a point beyond the connection plane of the header 18, with the stack of tubes 26. The contoured portion can allow for changes in length L (i.e., longitudinal flexibility), while the convoluted edges can compensate for changes in height h of the legs 82 (i.e., vertical flexibility). This can be desirable in embodiments where the height of the fin H is constrained by connection to the inner surfaces 38 of the tube 26, especially where the tube ends 68 are further constrained by the first and second headers 18, 20.

Figure 12:
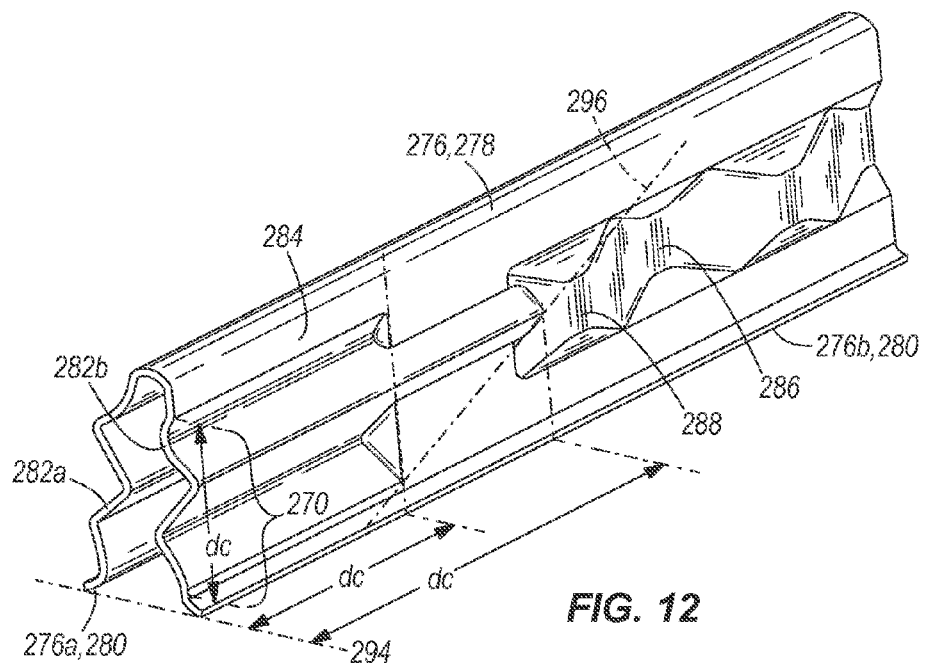
FIG. 12 is a perspective view of a portion of a heat exchanger fin according to some embodiments of the present invention.
Figure 13:
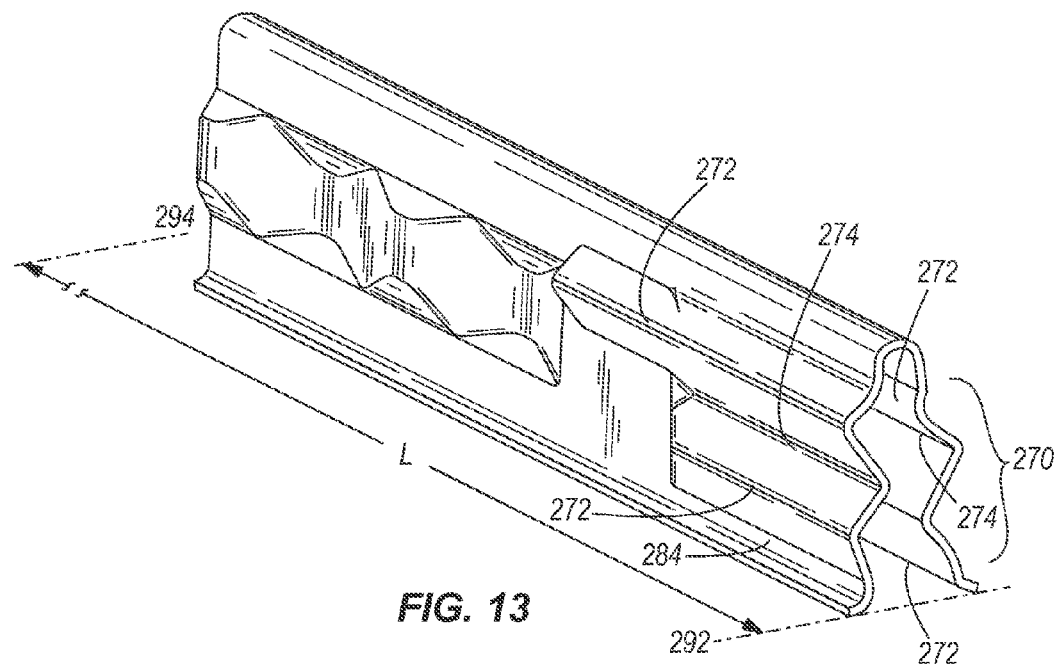
FIG. 13 is a perspective view of a portion of a heat exchanger fin according to some embodiments of the present invention.
Figure 14:
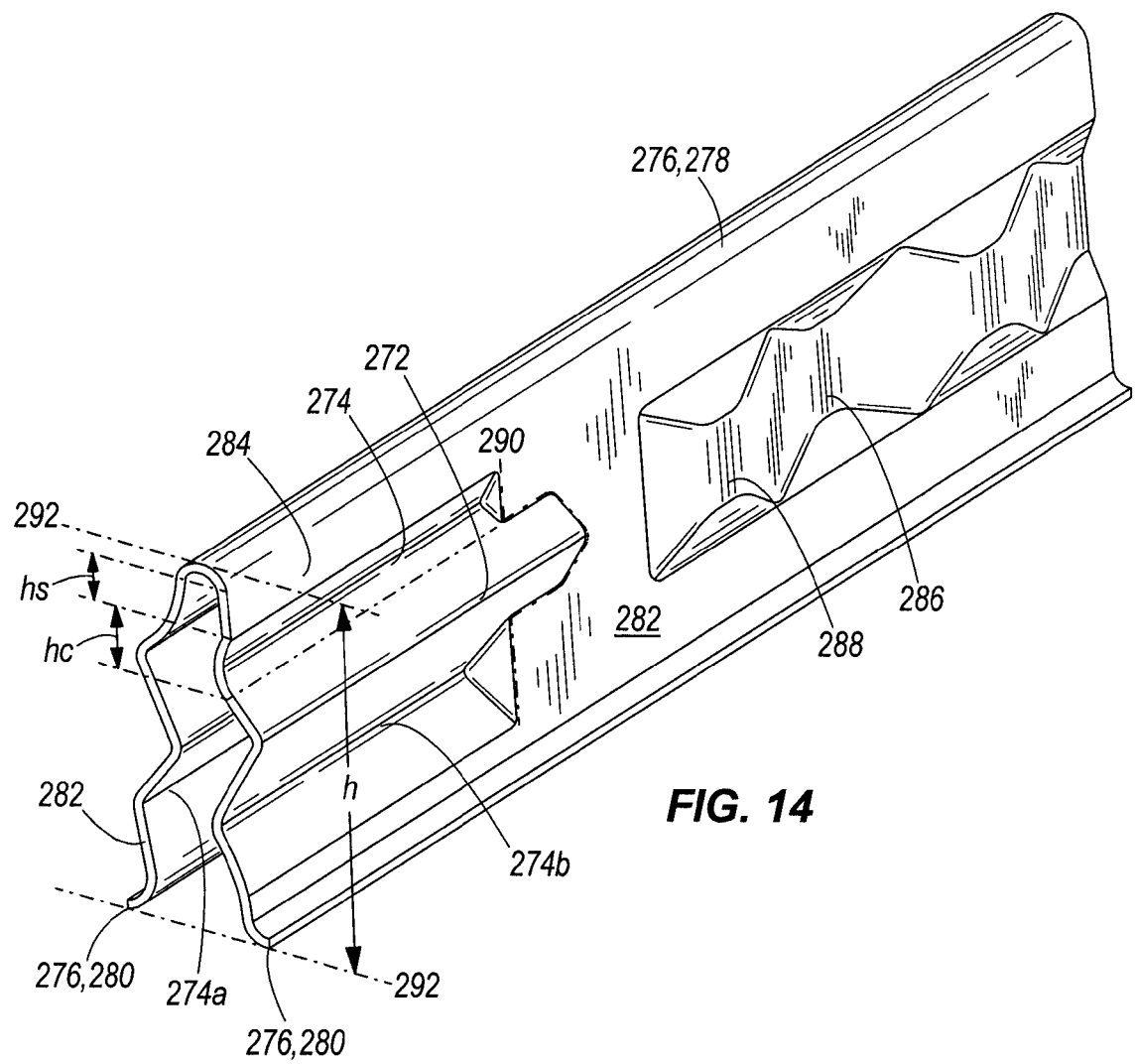
FIG. 14 is a perspective view of a portion of a heat exchanger fin according to some embodiments of the present invention.

FIGS. 12-14 represent an alternate embodiment of a heat exchanger fin 266 according to the present invention. The portion of a heat exchanger fin 266 shown in FIGS. 6 and 7 is similar in many ways to the illustrated embodiments of FIGS. 1-8 described above. Accordingly, with the exception of mutually inconsistent features and elements between the embodiment of FIGS. 12-14 and the embodiments of FIGS. 1-8, reference is hereby made to the description above accompanying the embodiments of FIGS. 1-8 for a more complete description of the features and elements (and alternatives and/or additions to the features and elements) of the embodiment of FIGS. 12-14. Features and elements in the embodiment of FIGS. 12-14 corresponding to features and elements in the embodiments of FIGS. 1-8 are numbered in the 200 series.

As illustrated in FIGS. 12-14, fin 266 can have convolutions 270 extending from the lateral edges 292, 294 a distance, dc (i.e., parallel to length, L) along the leg 282 of the fin 266, in a direction parallel to the folds 276 that define the leg 282. In other embodiments, convolutions 270 can be positioned along the fin 266 at a location that is not immediately adjacent a lateral edge 292, 294. Any number of convolutions 270 can be provided on a portion of leg 282, and the number of convolutions 270 can be consistent or vary from leg portion to leg portion (and/or from lateral edge 292 to lateral edge 294, and/or from fin 266 to fin 266, etc.). In addition, the geometrical shape of the convolutions 270 can vary from rounded to pointed. The number of differing shape convolutions 270 can be consistent or vary from leg portion to leg portion (and/or from lateral edge 292 to lateral edge 294, and/or from fin 266 to fin 266, etc.). Further, as shown in the illustrated embodiment of FIG. 14, the height, hc of each convolution, the total convoluted height, cc (see FIG. 12) on a particular leg 282, and the height, hs of any space (area lying in the plane of leg 282) between convolutions 270 can be consistent or vary from leg portion to leg portion (and/or from lateral edge 292 to lateral edge 294, and/or from fin 266 to fin 266, etc.).

Convolutions 270 can include beads 272 and dimples 274 that alternate along the height h of the fin 266. In general, a bead 272 is a convolution 270 projecting in one direction from the plane of a leg 282 (defined by a point adjacent each of the folds defining the leg and one other point on the leg 282), while a dimple 274 is a convolution projecting in the opposite direction from the plane of a leg 282. In order to clarify the following explanation, the following naming convention will be followed: when the surface of any particular leg 282 is viewed, beads 272 will extend away from the viewer while dimples 274 will extend toward the viewer. As such, it should be understood that two or more dimples 274 could be positioned adjacent each other (as could two or more beads 272).

FIGS. 12-14 illustrate that convolutions 270 on a single leg 282 can extend varying distances, dc along the length L of the fin 266. For example, in FIG. 12, the uppermost convolution, dimple 274, extends from lateral edge 292 of the fin 266 a distance, dc less than the adjacent convolution, bead 272 (immediately below the uppermost convolution). Further, two non-adjacent convolutions 290 can extend the same distance, dc (i.e., have the same length)-dimples 274 in FIG. 12 or dimple 274 and bead 272 in FIG. 13 for example. In other embodiments two or more adjacent convolutions 270 can extend the same distance, dc along the length L of the leg. In addition, the lengths of corresponding convolutions 270 (i.e., convolutions at the same height h—for example, 274a and 274b in FIG. 14) on adjacent legs 282 can be different or similar depending on the embodiment of the invention.

Alternatively or in addition, convolutions 270 can extend to different endpoints with respect to contour elements 286, 288. For example, in FIG. 12, the middle convolution, bead 272, extends from lateral edge 292 of the fin 266 into the protrusion 288 most proximal to the lateral edge 292. In such embodiments, adjacent ends of two of the convolutions 270 are oriented along, or intersected by, a line 296 which is non-perpendicular to the flow of working fluid along the flow path. As illustrated in the embodiment of FIG. 13, the uppermost convolution, bead 272, extends the farthest of all the convolutions on leg 282a and terminates immediately adjacent the contour element, recess 286. As illustrated in the embodiment of FIG. 14, the middle convolution 270 extends to an end point a distance away from the protrusion 288 most proximal to lateral edge 292.

In some embodiments of the present invention, spaces 284 (area lying in the plane of leg 282) can be provided between convolutions 270 and/or between a convolution 270 and a fold 276. As illustrated in FIG. 12, space 284 is provided between the uppermost dimple 274 and peak 278. In another example illustrated in FIG. 13, space 284 is provided between the lowermost bead 272 and valley 280.

It should be understood that any of the features or elements described above, particularly but not exclusively with respect to convolutions 270, can be provided on any, all, or none of the fins 266 in a heat exchanger 210 and/or the portions of a heat exchanger fin 266 (leg 282, fold 276, lateral edge 292, 294, etc.). Further, convolutions 270 can be provided on fins 266 having through-holes and/or cut outs in the leg 282 of the fin 266 (such as disclosed in U.S. patent application Ser. No. 11/367,611, hereby incorporated by reference), alternatively or in addition to contour elements 286, 288. Contour elements 286, 288 can, in some embodiments, be isolated from (i.e., not extend into) the folds 276 of the fin 266 as shown in FIGS. 12-14. Still further, convolutions 270 can be provided on the legs of fins 266 having louvers, slits or notches (such as disclosed in U.S. patent application Ser. No. 11/015,159), a combination of such features, and/or having no contour elements 286, 288 at all.

In embodiments having fins 266 with convolutions 270, such as the illustrated embodiments of FIGS. 3, 4, and 12-14, the fins 266 operate as elastic members to absorb or at least partially absorb vibrations and/or to absorb expansions and contractions of the fins 266 caused by fluctuating temperatures of the first and/or second working fluids. In some such embodiments, the elasticity of the contoured fins 266 in the region of the convolutions prevents or reduces cracking and breaking of the fins 66 and/or cracking and breaking of connections (e.g., solder points, braze points, weld points, etc.) between the spines 276 of the fins 266 and the interior sides of the tubes 226. Further, in the case that cracking does occur in such embodiments, a staggered profile 290 (see FIG. 14) where the convolutions 270 terminate along the height h of the leg (distal from the lateral edges 292, 294 of the fin 266) can force the crack to propagate a longer distance (in some cases following the profile 290) toward the connection points of the fin 266 with inner surfaces 238 of the tube 226) which can take longer to occur, thus extending the functional life of the heat exchanger 210. Alternatively or in addition, a varied staggered profile 290 of convolutions 270 adjacent legs 282 can cause cracks to propagate toward the inner surfaces 238 of the tube 226 at different positions along the length L of the tube, reducing the tendency of the tube itself to crack (and/or the extent of cracking), thereby preserving the isolation of first and second flow paths 234, 236 and extending the functional life of the heat exchanger 210.

Figure 9:
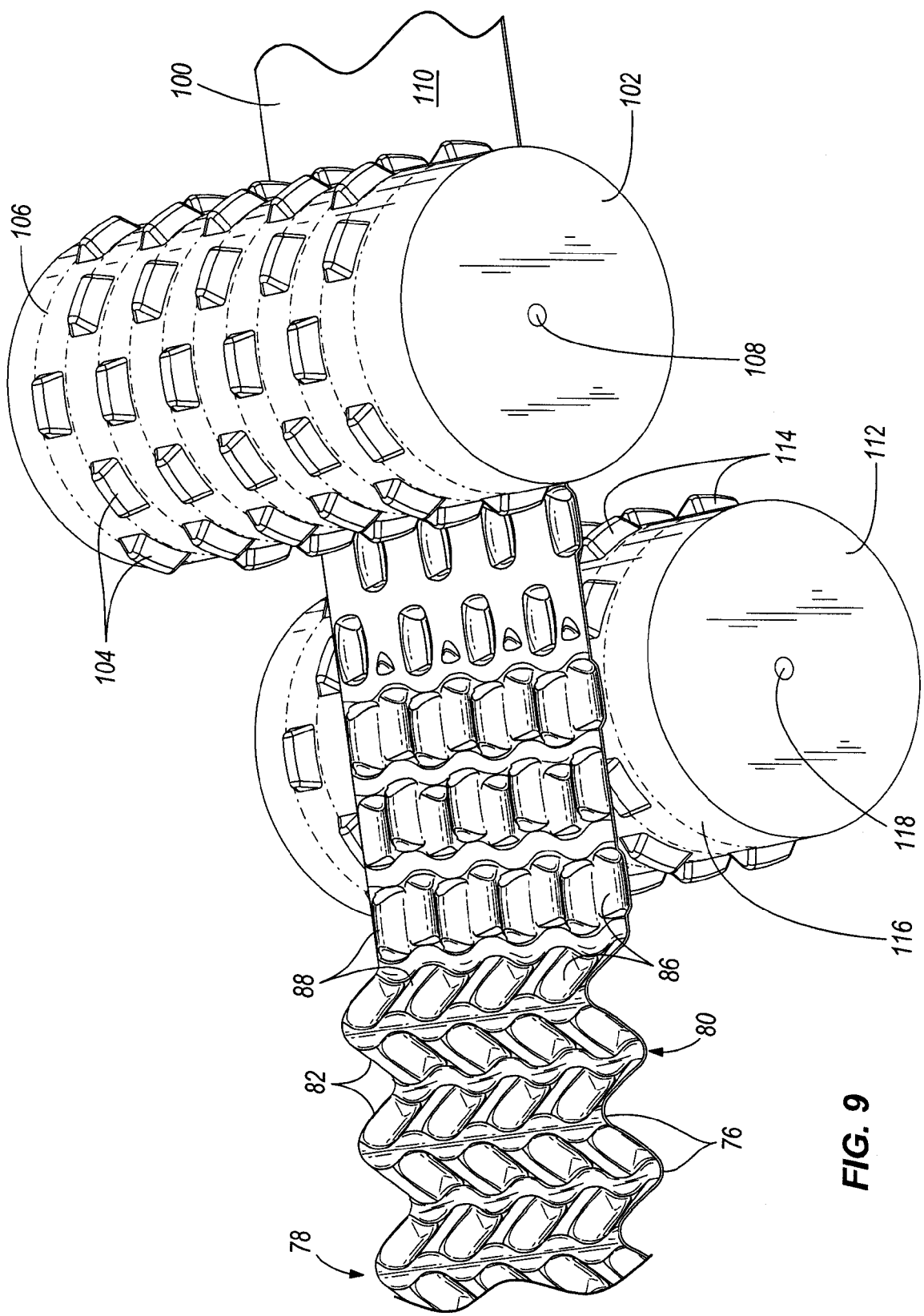
FIG. 9 illustrates a method for forming the fin shown in FIG. 5.

FIG. 9 illustrates a method of forming a fin 66 for a heat exchanger 10 according to some embodiments of the present invention. The method involves roll-forming a pattern of recesses 86 and protrusions 88 into a sheet of deformable heat conducting material 100 (e.g, aluminum, copper, bronze, and alloys including one or more of these metals). To clarify the description, the process of contour formation is shown in FIG. 9 (and discussed with reference to FIG. 9) as occurring in two distinct and consecutive steps for a particular longitudinally-located, lateral section of the sheet. First, at the right-hand side of the figure, recesses 86 are roll-formed, then, to the left of that, protrusions 88 are roll-formed. However, in practice, roll-formation of recesses 86 and protrusions 88 can be executed simultaneously (as described and illustrated with respect to the alternative embodiments shown in FIGS. 10 and 11 below). Whether the recesses 86 and protrusions 88 are formed consecutively or simultaneously, the roll-formed fin 66 in FIG. 9 then undergoes a folding process (right-hand side of the figure) to create spines 76. The steps discussed above can be incorporated into a high-speed assembly process which is described in more detail below.

As shown in FIG. 9, the method can make use of a first cylindrically-shaped roller 102 having projections 104 positioned in longitudinal rows along its curved exterior surface 106. The first roller 102 can be rotated about its axis 108 as it makes contact with a first side 110 of the sheet of deformable material 100, positioned tangentially with respect to the curved surface 106. The weight of the first roller 102 can be used to exert pressure on the deformable material such that the projections 104 form recesses 86 in the material 100. In other embodiments, the sheet of material 100 can be forced into contact with the roller 100 by other means to form recesses 86.

The shape and size of the projections 104 with respect to the thickness of the sheet of material 100 can be such that the recesses 86 formed by contact of projections 104 with the first side 110 of the sheet of deformable material 100 create their geometric complement on a second side (not visible) of the sheet 100 which is opposite to the first side 110. Thus, recesses 86 and protrusions 88 can be simultaneously formed on the first side 110 and an opposite second side of the sheet 100, respectively.

A second cylindrically-shaped roller 112 having projections 114 positioned in longitudinal rows along its curved surface 116 can be positioned adjacent to the opposite side of the sheet 100 from the first roller 102. The second roller 112 can also be rotated about its axis 118 as it makes contact with the second side of the sheet of deformable material 100, positioned tangentially with respect to the curved surface 116. In this way, recesses 86 can be formed on the second side of the sheet 100, and corresponding projections 88 can be formed on the first side 110.

Figure 8:
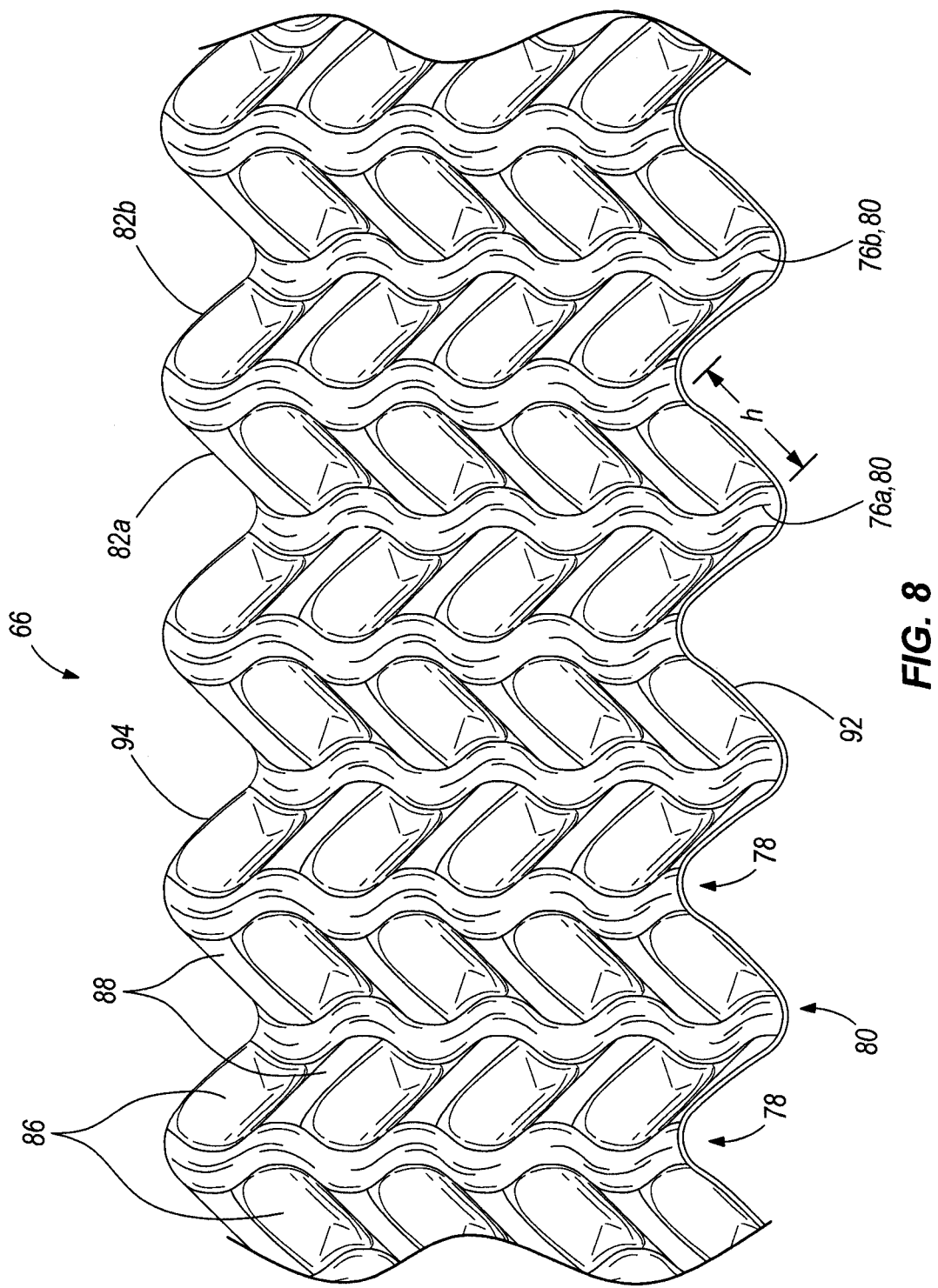
FIG. 8 is a perspective view of a partially formed fin that can be manufactured according to the method shown in FIG. 10.

The rollers 102, 112 can be formed by axially stacking cylindrical disks, the boundaries of which are illustrated by dashed lines in FIG. 9. In some embodiments, disks with various shaped projections 114 and/or circumferential spacing between projections 114 can be assembled into a roller that will form fins 66 with different dimensions and geographies. Similarly, the disks can be circumferentially staggered to provide fins 66 with more or less space between rows of contour elements, which can result in wider or narrower spines 76. The rollers 102, 112 can be arranged with respect to each other such that the recesses 86 and protrusions 88 on each side of the sheet are formed at specific locations with respect to each other. For example, FIGS. 7-9 illustrate how the rollers 102, 112 can be aligned to form lateral and longitudinal rows of alternating recesses 86 and protrusions 88 along the sheet 100. The lateral rows are separated by narrow gaps where the sheet 100 can be folded to form corrugations such that the lateral rows become legs 82 and the gaps become spines 76. In the illustrated embodiment, the rollers 102, 112 are staggered slightly to form serpentine-shaped spines 76. In other embodiments, the rollers 102, 112 can be aligned to form straight spines 76. In still other embodiments, the positioning, size, and/or shape of the projections 104, 114 on the first and/or second rollers 102, 112 can be varied to change the geometry and/or topography of the fin 66. In still other embodiments, curved surfaces 106, 116 of the rollers 102, 112 can be provided with indentions corresponding (i.e., in location, size, shape, etc.) to the projections 114, 104 in the opposing roller 112, 102, in order to better define the contours formed in the sheet 100.

Figure 10:
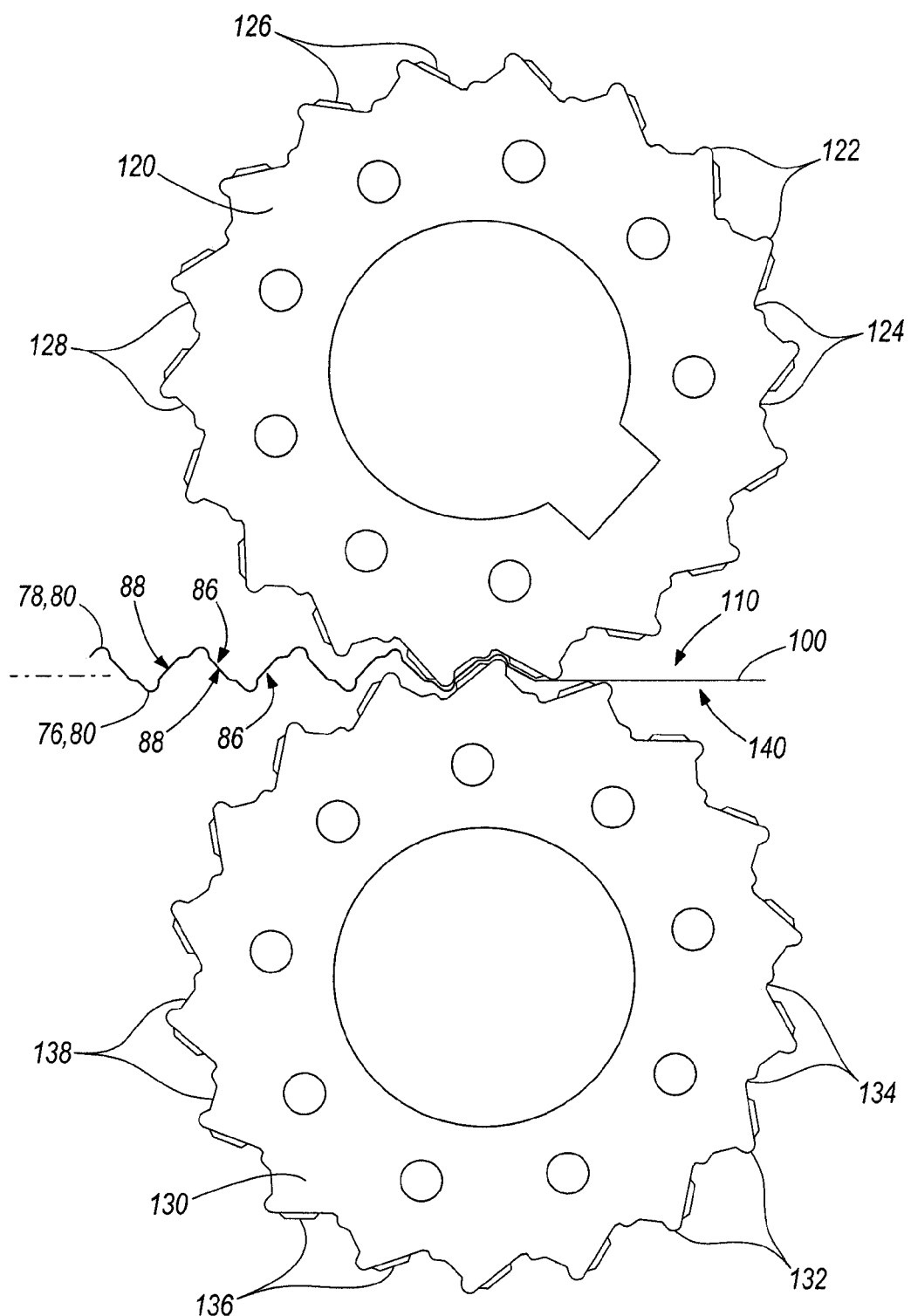
FIG. 10 illustrates another method for forming the fin shown in FIG. 5.

FIG. 10 illustrates a method of forming fins 66 according to another embodiment of the invention. The method illustrated in FIG. 10 uses star-shaped rollers to simultaneously form contour elements and partially fold the fin 66. A first star-shaped disk 120 represents a first star-shaped roller that is positioned on a first side 110 of a sheet of deformable material 100 in the illustrated embodiment of FIG. 10. Along the circumference of the first disk 120, alternating ridges 122 and crevasses 124 create the star shape of the disk. The ridges 122 and crevasses 124 can contribute to the formation of peaks 78 and valleys 80 as will be described in further detail below. Between each ridge 122 and crevasse 124 is formed a projection 126 or an indention 128. The projections 126 and indentions 128 can form recesses 86 and protrusions 88 in the fin as will also be discussed in further detail below. In some embodiments, such as the illustrated embodiment, the projections 126 and indentions 128 can be geometric complements and have multiple planes of symmetry as discussed previously with respect to recesses 86 and protrusions 88. In other embodiments, the ridges 122 can be geometric complements of crevasses 124.

A second star-shaped disk 130 in FIG. 10 represents a second star-shaped roller that can have alternating ridges 132 and crevasses 134 that separate alternating projections 136 and indentions 138 similar (i.e., in shape, size, etc.) to those of the first disk 120. Alternatively or in addition, the projections 136 can be geometric complements of indentions 128 and projections 126 can be geometric complements of indentions 138, in which case, projections 126, 136 need not be geometric complements of indentions 128, 138 on the same disk. The second star-shaped disk 130 is positioned on a second side 140 of the sheet of material 100.

The first and second star-shaped disks 120, 130 can be positioned with respect to each other such that each ridge 122 of the first disk 120 fits within a crevasse 134 of the second disk 130 and each ridge 132 of the second disk 130 fits within a crevasse 124 of the first disk 120 as the disks 120, 130 turn on their respective axes. Thus, when the sheet of deformable material 100 is fed between the star-shaped disks 120, 130, the corresponding ridges 122 and crevasses 134 fold the material to form peaks 78, and corresponding ridges 132 and crevasses 124 fold the material to form valleys 80. Similarly, the projections 126, 136 and corresponding indentions 138, 128 form recesses 86 and protrusions 88 in the fin 66.

Figure 11:
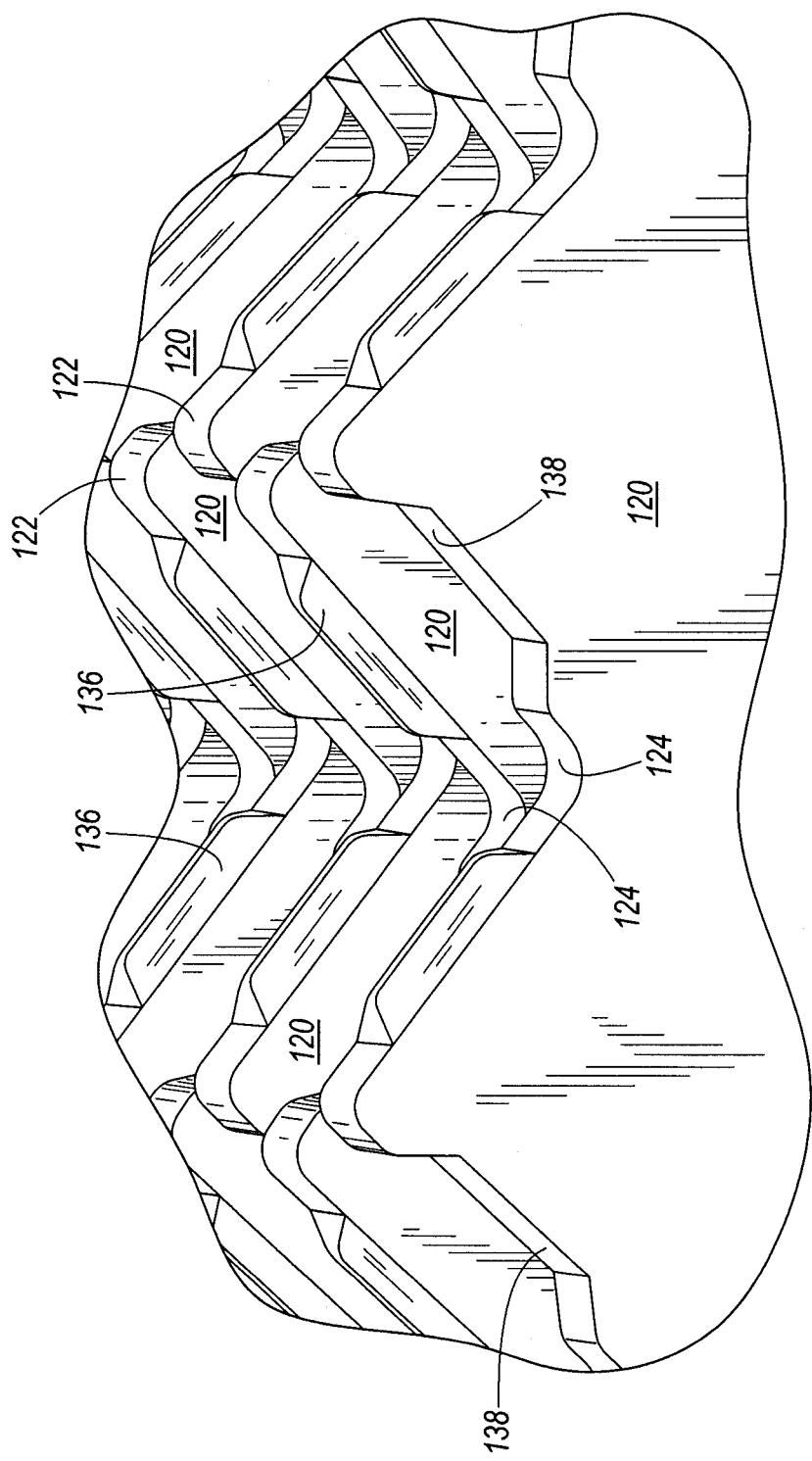
FIG. 11 is a perspective view of a section of the fin forming device shown in FIG. 10.

Star-shaped rollers can be made up of star-shaped disks 120 that are stacked axially, similar to the arrangement discussed above with respect to the embodiment of FIG. 9. FIG. 11 illustrates how these star-shaped disks 120 can be stacked in an alternating arrangement such that a projection 126 in one disk is positioned adjacent an indention 128 in a second disk. Adjacent disks can be staggered such that the ridges 122 and crevasses 124 in one disk are not in direct alignment with the ridges 122 and crevasses 124 in a second disk, as shown in FIG. 11. By complementary positioning of two star-shaped rolls having this arrangement of disks, a fin 66 can be formed having serpentine spines 76, as shown in FIGS. 3-8.

After the fins 66 have been roll-formed and folded, they can be cut to the appropriate size and then fined into tubes 26. In other embodiments, the fins 66 can be cut before they are folded. Alternatively, the tubes 26 can be assembled around the fins 66. In still other embodiments, the tubes 26 and the fins 66 can be cut to size simultaneously.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

What is claimed is:

1. A corrugated fin for a heat exchanger, the heat exchanger having a flow path of a first working fluid and a flow path of a second working fluid and being operable to transfer heat between the first and second working fluids, the fin comprising:
   a leg defined between adjacent folds and positionable along the flow path of the first working fluid; and
   a plurality of convolutions extending inwardly from a distal end of the leg, at least some of the plurality of convolutions having different lengths in the direction of the flow of the first working fluid along the flow path,
   wherein the plurality of convolutions include three adjacent convolutions, and wherein two of the three convolutions have similar lengths in a direction substantially parallel to a spine formed between the leg and an adjacent leg.

2. The corrugated fin of claim 1, wherein at least one of the plurality of convolutions terminates adjacent to a contour extending along the leg.

3. The corrugated fin of claim 1, wherein at least two non-adjacent ones of the plurality of convolutions extend inwardly a common distance in the direction of the flow of the first working fluid along the flow path.

4. The corrugated fin of claim 1, wherein the corrugated fin includes a plurality of adjacent legs, each of the plurality of adjacent legs including a plurality of convolutions extending inwardly from distal ends of the legs and terminating at different distances from the ends in the direction of the flow of the first working fluid along the flow path.

5. The corrugated fin of claim 1, wherein adjacent ends of at least two of the plurality of convolutions are intersected by a line which is non-perpendicular to the flow of the first working fluid along the first flow path.

6. The corrugated fin of claim 1, wherein the two of the three convolutions are shorter than the other of the three convolutions in the direction substantially parallel to the spine.

7. The corrugated fin of claim 1, wherein the two of the three convolutions are positioned on opposite sides of the other of the three convolutions.

8. The corrugated fin of claim 1, wherein the two of the three convolutions are positioned adjacent each other.

9. A corrugated fin for a heat exchanger, the heat exchanger having a flow path of a first working fluid and a flow path of a second working fluid and being operable to transfer heat between the first and second working fluids, the fin comprising:
   a leg defined between adjacent folds and positionable along the flow path of the first working fluid; and
   a plurality of convolutions extending inwardly from a distal end of the leg and having different lengths in the direction of the flow of the first working fluid along the flow path,
   wherein the plurality of convolutions include at least three adjacent convolutions with a middle one of the convolutions having a greater length in a direction substantially parallel to a spine formed between the leg and an adjacent leg.

10. A corrugated fin for a heat exchanger, the heat exchanger having a flow path of a first working fluid and a flow path of a second working fluid and being operable to transfer heat between the first and second working fluids, the fin comprising:
    a leg defined between adjacent folds and positionable along the flow path of the first working fluid; and
    a plurality of convolutions extending inwardly from a distal end of the leg and having different lengths in the direction of the flow of the first working fluid along the flow path,
    wherein opposite ends of the leg are secured between tube walls and, in a region of connection of the tubes to a collecting tank, the convolutions are configured to compensate for length changes in a stacking direction of the tubes caused by temperature changes.

11. A corrugated fin for a heat exchanger, the heat exchanger having a flow path of a first working fluid and a flow path of a second working fluid and being operable to transfer heat between the first and second working fluids, the fin comprising:
    a leg defined between adjacent folds and positionable along the flow path of the first working fluid; and
    a plurality of convolutions extending inwardly from a distal end of the leg and having different lengths in the direction of the flow of the first working fluid along the flow path,
    further comprising a plurality of adjacent legs, each of the plurality of adjacent legs including a plurality of convolutions extending inwardly from distal ends of the legs and terminating at a distance in the direction of the flow of the first working fluid along the flow path different than a corresponding convolution of an adjacent leg.

* * * * *

UNITED STATES PATENT AND TRADEMARK OFFICE
CERTIFICATE OF CORRECTION

| | | |
|---|---|---|
| PATENT NO. | : 8,424,592 B2 | Page 1 of 1 |
| APPLICATION NO. | : 12/182747 | |
| DATED | : April 23, 2013 | |
| INVENTOR(S) | : Steven P. Meshenky and Charles M. Rastall | |

It is certified that error appears in the above-identified patent and that said Letters Patent is hereby corrected as shown below:

Title Page, Item (63) Related U.S. Application should read:
-- Continuation-in-part of application No. PCT/US2008/051747, filed on January 23, 2008. --.

In the specification,

After the sub-heading "CROSS-REFERENCE TO RELATED APPLICATIONS"
Column 1, lines 8-14 should read -- The present application is a continuation-in-part of application No. PCT/US2008/051747, filed on January 23, 2008. --.

Signed and Sealed this
Nineteenth Day of April, 2016

Michelle K. Lee
*Director of the United States Patent and Trademark Office*